US011581722B2

(12) United States Patent
Shanbhag et al.

(10) Patent No.: US 11,581,722 B2
(45) Date of Patent: *Feb. 14, 2023

(54) ELECTRICAL CABLE SPLICE

(71) Applicant: TE CONNECTIVITY SOLUTIONS GMBH, Schaffhausen (CH)

(72) Inventors: Megha Shanbhag, Sunnyvale, CA (US); Alex Michael Sharf, Harrisburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,817

(22) Filed: Mar. 13, 2020

(65) Prior Publication Data

US 2020/0212663 A1 Jul. 2, 2020

Related U.S. Application Data

(63) Continuation of application No. 15/431,982, filed on Feb. 14, 2017, now Pat. No. 10,622,799.

(51) Int. Cl.

| *H02G 15/08* | (2006.01) |
|---|---|
| *H01R 4/20* | (2006.01) |
| *H01R 11/11* | (2006.01) |
| *H01R 9/03* | (2006.01) |
| *H01R 13/6591* | (2011.01) |

(Continued)

(52) U.S. Cl.
CPC .............. *H02G 15/08* (2013.01); *H01R 4/20* (2013.01); *H01R 9/03* (2013.01); *H01R 11/11* (2013.01); *H01R 13/65915* (2020.08); *H01R 4/00* (2013.01); *H01R 4/02* (2013.01);

(Continued)

(58) Field of Classification Search
CPC ... H01R 4/00; H01R 4/02; H01R 4/18; H01R 4/20; H01R 4/21; H01R 4/60; H02G 15/08
See application file for complete search history.

(56) References Cited

U.S. PATENT DOCUMENTS

| 3,049,582 A | 8/1962 | Shinn |
|---|---|---|
| 3,519,731 A | 7/1970 | Grunbaum |

(Continued)

FOREIGN PATENT DOCUMENTS

| CN | 202585777 U | 12/2012 |
|---|---|---|
| CN | 102870280 A | 1/2013 |
| CN | 106207532 A | 12/2016 |

OTHER PUBLICATIONS

Translation of Chinese Search Report provided in Office Action, dated Jul. 17, 2020 in Chinese Application No. 20181014055.2, Filing Date, Feb. 11, 2018, 3 pgs.

*Primary Examiner* — Paresh Paghadal (57) ABSTRACT

An electrical cable splice includes a housing having a channel configured to hold a first signal conductor of a first electrical cable therein. The channel is configured to hold a second signal conductor of a second electrical cable therein in electrical engagement with the first signal conductor such that the first and second signal conductors are electrically interconnected. The second electrical cable has a greater diameter than the first electrical cable. A ground shield external to the housing such that the ground shield extends at least partially around the first and second signal conductors. The ground shield is electrically connected to electrical ground conductors of the first and second electrical cables.

18 Claims, 4 Drawing Sheets

(51) Int. Cl.
*H01R 9/05* (2006.01)
*H01R 4/02* (2006.01)
*H01R 4/18* (2006.01)
*H01R 4/00* (2006.01)

(52) U.S. Cl.
CPC ............... *H01R 4/021* (2013.01); *H01R 4/18* (2013.01); *H01R 9/0503* (2013.01)

(56) References Cited

U.S. PATENT DOCUMENTS

| | | | | |
|---|---|---|---|---|
| 3,596,231 A * | 7/1971 | Melton | ............. | H01R 4/20 439/426 |
| 3,827,704 A | 8/1974 | Gillemot et al. | | |
| 3,859,455 A * | 1/1975 | Gommans | ............. | H01R 9/0503 174/88 C |
| 4,408,816 A | 10/1983 | Knecht | | |
| 4,413,028 A | 11/1983 | Diaz | | |
| 5,047,594 A | 9/1991 | Powell | | |
| 5,125,060 A | 6/1992 | Edmundson | | |
| 5,217,392 A * | 6/1993 | Hosler, Sr. | ............. | H01R 9/0503 174/88 C |
| 5,231,758 A * | 8/1993 | Schauer | ............. | H01R 4/021 156/49 |
| 5,780,774 A * | 7/1998 | Ichikawa | ............. | H01R 12/61 174/117 FF |
| 5,942,730 A | 8/1999 | Schwarz et al. | | |
| 6,246,000 B1 * | 6/2001 | Wehrmann | ............. | H01R 4/023 174/74 R |
| 6,376,773 B1 * | 4/2002 | Maegawa | ............. | H01R 12/63 174/117 F |
| 7,012,194 B1 * | 3/2006 | Wang | ............. | H01R 4/5066 174/138 F |
| 8,152,537 B1 | 4/2012 | Montena | | |
| 8,209,855 B2 | 7/2012 | Hilberts et al. | | |
| 9,793,631 B1 | 10/2017 | Miller et al. | | |
| 9,917,434 B2 * | 3/2018 | George | ............. | H01B 13/06 |
| 2007/0012470 A1 | 1/2007 | Konnik | | |
| 2007/0243730 A1 | 10/2007 | Gladd et al. | | |
| 2009/0035990 A1 | 2/2009 | McCarthy | | |
| 2013/0224990 A1 | 8/2013 | Reul et al. | | |
| 2014/0338953 A1 | 11/2014 | Seraj et al. | | |
| 2015/0096803 A1 * | 4/2015 | Pope | ............. | H02G 1/16 174/84 R |
| 2016/0071630 A1 | 3/2016 | Sugino | | |
| 2016/0142030 A1 * | 5/2016 | Hamner | ............. | H01B 11/002 174/70 R |
| 2017/0330648 A1 * | 11/2017 | Krogh | ............. | B23K 13/00 |
| 2018/0131168 A1 * | 5/2018 | Tanaka | ............. | H01R 43/0214 |
| 2018/0134234 A1 * | 5/2018 | Nickolaou | ............. | G03B 17/561 |
| 2018/0301242 A1 * | 10/2018 | Sugino | ............. | H01R 4/64 |

* cited by examiner

ELECTRICAL CABLE SPLICE

CROSS-REFERENCE TO RELATED APPLICATIONS

This application is a continuation application of, and claims benefit to the filing date of, U.S. patent application Ser. No. 15/431,982, filed Feb. 14, 2017, titled, ELECTRICAL CABLE SPLICE, the subject matter of which is herein incorporated by reference in its entirety.

BACKGROUND

The subject matter herein relates generally to electrical cables that interconnect various electrical devices.

Electrical cables and connectors are used to transmit data in various industries. The electrical cables span the distance between the electrical devices to provide electrical paths between the electrical devices. The electrical connectors terminate the electrical cables and mate with complementary connectors of the electrical devices to interconnect the electrical devices via the electrical pathways provided by cables.

The termination interface of some connectors where the connector terminates multiple cables may have a relatively high density of electrical connections and therefore a relatively tight grouping of the cables, for example because of the small form factor and/or number of signal paths of many contemporary connectors. The termination interface of some connectors therefore may only accommodate electrical cables up to a certain diameter in size. In other words, the termination interface of some connectors may only accommodate relatively small diameter cables. But, such small diameter cables may not be suitable for spanning some distances between electrical devices because of the loss rate of the small diameter cable. Specifically, the loss rate for cables that have a sufficiently small diameter to fit within the termination interface of the connector may be unacceptably high. Conversely, larger diameter cables that have acceptable loss rates for the given distance between the electrical devices are too large to be grouped within the termination interface of the connector.

Accordingly, a need remains for a lower loss electrical cable that can be terminated to a connector having a termination interface with a relatively high density of electrical connections.

BRIEF DESCRIPTION

In an embodiment, an electrical cable splice includes a housing having a channel configured to hold a first signal conductor of a first electrical cable therein. The channel is configured to hold a second signal conductor of a second electrical cable therein in electrical engagement with the first signal conductor such that the first and second signal conductors are electrically interconnected. The second electrical cable has a greater diameter than the first electrical cable. A ground shield external to the housing such that the ground shield extends at least partially around the first and second signal conductors. The ground shield is electrically connected to electrical ground conductors of the first and second electrical cables.

In an embodiment, an electrical cable assembly includes a first electrical cable having a first signal conductor and a first electrical ground conductor, and a second electrical cable having a second signal conductor and a second electrical ground conductor. The second electrical cable has a greater diameter than the first electrical cable. The assembly also includes a cable splice that includes a housing having a channel configured to hold the first and second signal conductors therein in electrical engagement with each other such that the first and second signal conductors are electrically interconnected. The cable splice also includes a ground shield that holds the housing such that the ground shield extends at least partially around the first and second signal conductors. The ground shield is electrically connected to the first and second electrical ground conductors.

In an embodiment, an electrical connector assembly includes a first electrical cable having a first signal conductor and a first electrical ground conductor, an electrical connector terminated to the first electrical cable, and a second electrical cable having a second signal conductor and a second electrical ground conductor. The second electrical cable has a greater diameter than the first electrical cable. The assembly also includes a cable splice that includes a housing having a channel configured to hold the first and second signal conductors therein in electrical engagement with each other such that the first and second signal conductors are electrically interconnected. The cable splice also includes a ground shield that is external to the housing such that the ground shield extends at least partially around the first and second signal conductors. The ground shield is electrically connected to the first and second electrical ground conductors.

DETAILED DESCRIPTION

Figure 1:
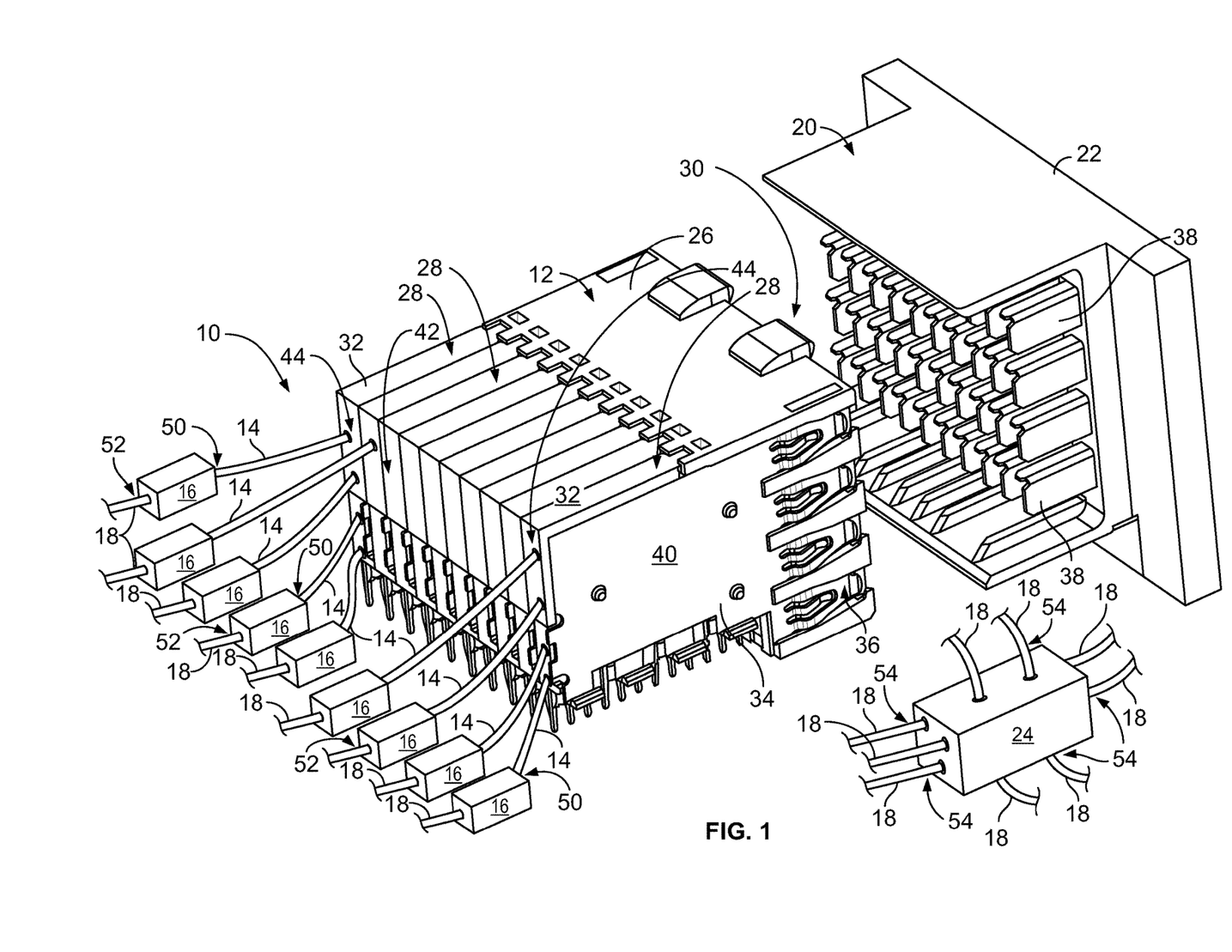
FIG. 1 is a perspective view of an embodiment of an electrical connector assembly.

FIG. 1 is a perspective view of an embodiment of an electrical connector assembly 10. The assembly 10 includes an electrical connector 12, electrical cables 14, electrical cable splices 16, and electrical cables 18. The electrical connector 12 is configured to mate with a complementary electrical connector 20 that is mounted to one or more other electrical cables (not shown) or directly to an electrical device 22 as is shown in the exemplary embodiment. The cables 14 are terminated to the connector 12 (i.e., the connector 12 terminates, or is terminated to, the cables 14). The electrical cable splices 16 electrically connect the cables 18 to corresponding cables 14 to provide electrical pathways between the electrical device 22 and another electrical device 24. As will be described below, the cables 18 have diameters larger than diameters of the cables 14. Each electrical device 22 and 24 may be any type of electrical device. Each of the cables 14 may be referred to herein as a "first electrical cable", while each of the cables 18 may be referred to herein as a "second electrical cable".

The connector 12 includes a housing 26 that holds contact modules 28. The contact modules 28 hold signal contacts (not shown) and ground contacts (not shown) that extend along a mating interface 30 of the connector 12 at which the connector 12 mates with the complementary connector 20. In the exemplary embodiment, the contact modules 28 are oriented generally along vertical planes. But, other orientations are possible in other embodiments. For example, in some embodiments, the contact modules 28 are oriented generally along horizontal planes.

Each contact module 28 includes a dielectric carrier 32 that holds an array of conductors. The carrier 32 may be overmolded over the array of conductors, though additionally or alternatively other manufacturing processes may be utilized to form the carrier 32. Optionally, the array of conductors is stamped and formed as an integral leadframe prior to overmolding of the carrier 32. Portions of the leadframe that connect the conductors are removed after the overmolding to provide individual conductors in the array held by the carrier 32. In addition or alternatively, other manufacturing processes are used to form the conductor array.

The conductor array includes the signal contacts, signal mounting contacts (not shown) described below, and leads (not shown) that connect the signal contacts to the corresponding signal mounting contacts. The signal contacts, the leads, and the signal mounting contacts define signal paths through the contact module 28. Optionally, the signal contacts are arranged in pairs carrying differential signals.

In the exemplary embodiment, the contact modules 28 include ground shields 34 that provide impedance control along the signal paths and/or electrical shielding for the signal contacts from electromagnetic interference (EMI) and/or radio frequency interference (RFI). The ground shields 34 include ground contacts 36 that are configured to mate with corresponding mating ground shields 38 of the complementary connector 20. The ground shields 34 also include ground mounting contacts (not shown) that will be described below. The ground contacts 36, a body 40 of a corresponding ground shield 36, and the ground mounting contacts define ground paths through the contact module 28. In some alternative embodiments, the ground contacts 38 and the ground mounting contacts are formed as part of the conductor array described above.

The connector 12 includes a termination interface 42 where (i.e., at which) the cables 14 are terminated to the connector 12. Specifically, at ends 44 of the cables 14, signal conductors 46 (shown in FIGS. 2 and 3) and ground conductors 48 (shown in FIGS. 2 and 3) of the cables 14 are terminated in electrical connection with corresponding signal and ground mounting contacts, respectively, which are arranged along the termination interface 42. In the exemplary embodiment, forty cables 14 are terminated to the connector 12 at the termination interface 42. Specifically, each of the ten contact modules 28 terminates four cables 14. But, any number of the cables 14 may be terminated to the connector 12. Moreover, other arrangements of the cables 14 along the termination interface 42 are possible in other embodiments. Only some of the cables 14, cable splices 16, and cables 18 are shown in FIG. 1 for clarity.

The electrical cable splices 16 electrically connect opposite (relative to the ends 44) ends 50 of the cables 14 to ends 52 of corresponding cables 18. Opposite (relative to the ends 52) ends 54 of the cables 18 are terminated to another electrical connector (not shown) or directly to the electrical device 24 as is shown in the exemplary embodiment.

Various embodiments of a cable splice 16 may be configured for certain applications. Although shown herein for use with an electrical connector 12, in other embodiments a cable splice 16 is used to electrically interconnect two cables wherein one or both cables is not terminated to an electrical connector (e.g., an embodiment wherein the cables 14 are terminated directly to the electrical device 22). Although shown herein as used with an electrical connector 12 that is similar to electrical connectors of the STRADA Whisper or Z-PACK TinMan product lines developed by TE Connectivity, the cable splices 16 may be used with any other type of electrical connector.

Embodiments of the cable splices 16 may be, but are not limited to being, used with electrical connectors that have relatively high-density arrays of electrical contacts (e.g., a relatively high-density array may have at least 12 or at least 20 signal contacts per 100 $mm^2$ along the termination interface 42). Embodiments of the cable splices 16 may be, but are not limited to being, used with electrical connectors that are small-form factor connectors (e.g., electrical connectors configured to be compliant with certain standards, such as, but not limited to, the small-form factor pluggable (SFP) standard, enhanced SFP (SFP+) standard, quad SFP (QSFP) standard, C form-factor pluggable (CFP) standard, and 10 Gigabit SFP standard, which is often referred to as the XFP standard). Non-limiting examples of some applications of the cable splices 16 that may use embodiments set forth herein include host bus adapters (HBAs), redundant arrays of inexpensive disks (RAIDs), workstations, servers, storage racks, high performance computers, or switches.

The assembly 10 may or may not be considered to include the electrical connector 20, the electrical device 22, the electrical device 24, and/or any electrical connector (if included) terminated to an end 54 of a cable 14. A combination of a cable 14, a cable splice 16, and a cable 18 may be referred to herein as an "electrical cable assembly".

Figure 2:
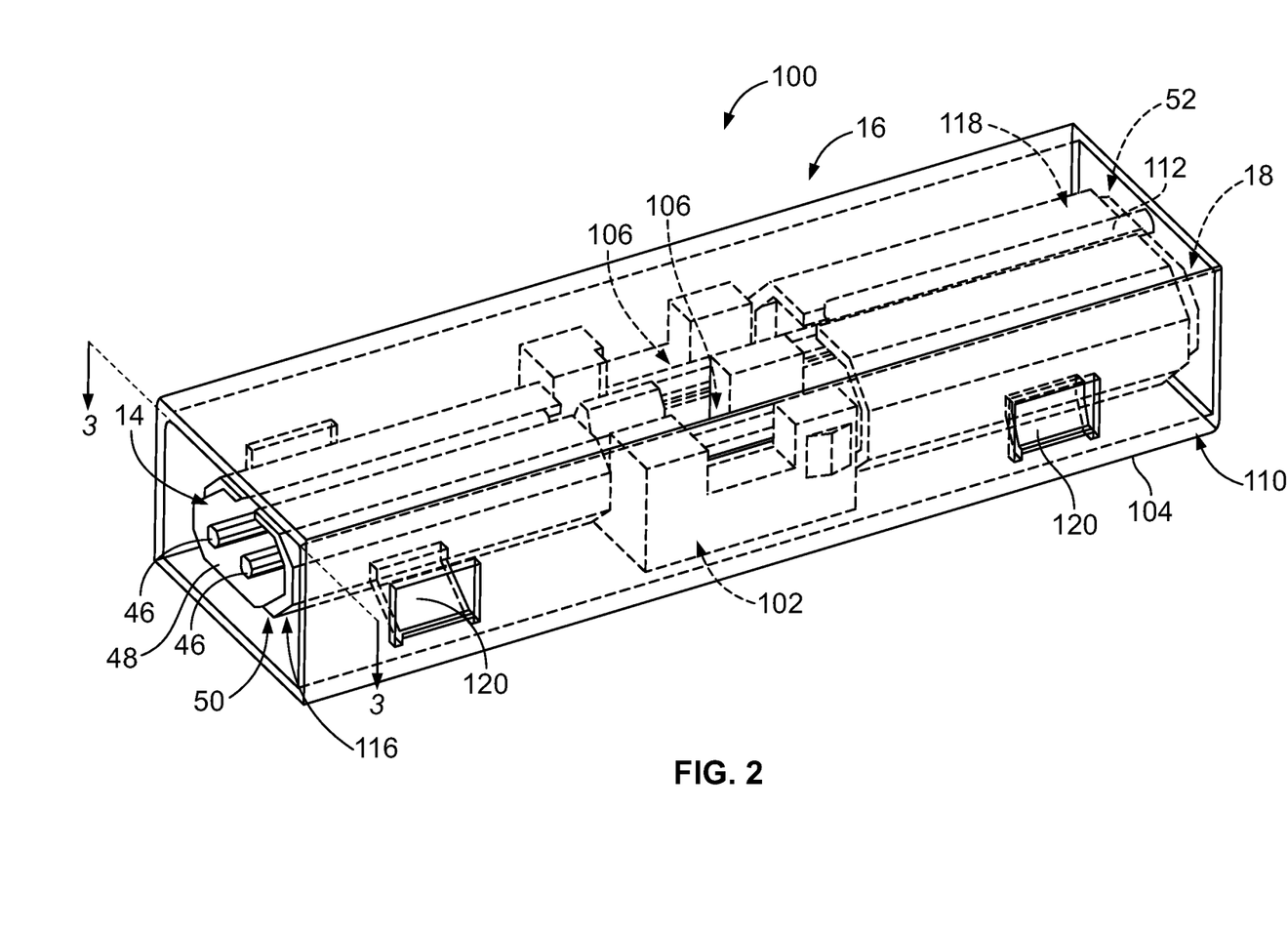
FIG. 2 is a perspective view of an embodiment of an electrical cable assembly of the connector assembly shown in FIG. 1.
Figure 3:
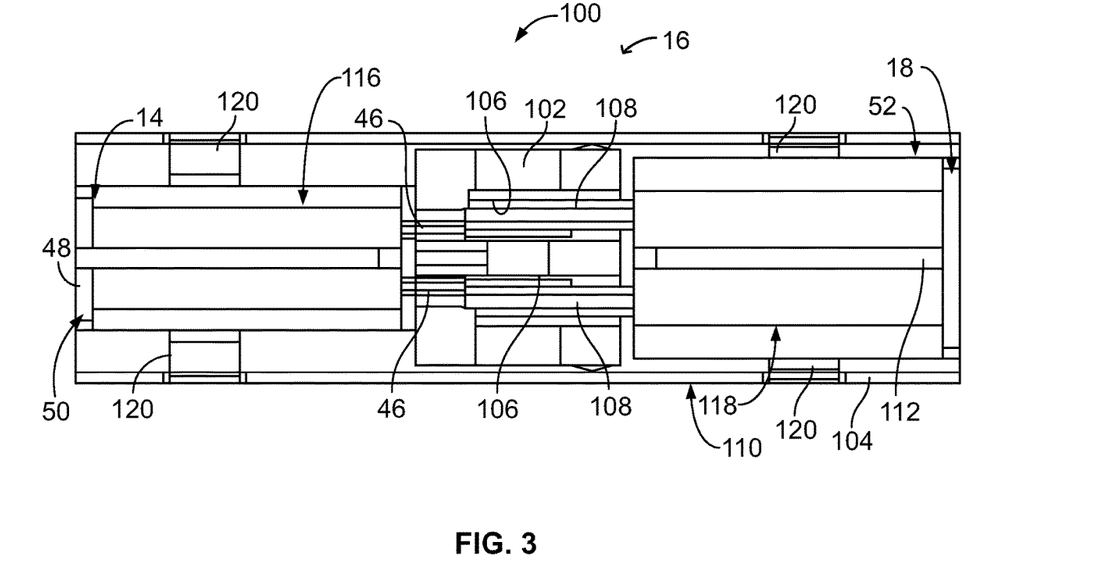
FIG. 3 is a cross-sectional view of the cable assembly shown in FIG. 2 taken along line 3-3 of FIG. 2.

FIG. 2 is a perspective view of an embodiment of an electrical cable assembly 100 of the connector assembly 10 (FIG. 1). FIG. 3 is a cross-sectional view of the assembly 100 taken along line 3-3 of FIG. 2. Referring now to FIGS. 2 and 3, the cable assembly 100 includes a cable 14, a cable splice 16, and a cable 18. As described above, the cable 18 has a larger diameter than the cable 14. The cable splice 16 enables two cables having different diameters to be electrically connected (i.e., spliced) together. In the exemplary embodiment, the cable 14 is 30 American Wire Gauge (AWG) and the cable 18 is 26 AWG. But, each of the cables 14 and 18 may have any diameter. The smaller diameter cables 14 may reduce cross-talk between the adjacent pairs. Moreover, in the exemplary embodiment, the cable 14 is a twinax cable that includes two signal conductors 46, and the cable 18 is also a twinax cable that includes two signal conductors 108. But, each cable 14 and 18 may include any other number of signal conductors in other embodiments. Each of the signal conductors 46 may be referred to herein as a "first" and/or a "third" signal conductor. Each of the signal conductors 108 may be referred to herein as a "second" and/or a "fourth" signal conductor.

The cable splice 16 includes a housing 102 and an electrical ground shield 104. The ground shield 104 is shown in phantom in FIG. 2 for clarity. The housing 102 includes one or more channels 106. Each channel 106 is configured to hold both a signal conductor 46 of the cable 14 and a corresponding signal conductor 108 of the cable 18. The channel 106 is configured to hold the two signal conductors 46 and 108 in electrical engagement with each other such that the two signal conductors 46 and 108 are electrically interconnected. As best seen in FIG. 3, the signal conductors 108 of the larger diameter cable 18 have a greater diameter than the signal conductors 46 of the smaller diameter cable 14. Accordingly, each channel 106 is configured to hold two signal conductors (from two different cables) that have different diameters in electrical engagement with each other. The cable splice 16 thus enables a larger diameter cable (e.g., the cable 18) to be electrically connected (i.e., spliced) to a smaller diameter cable (e.g., the cable 14).

Specifically, the size and shape of the channel 106 is selected to hold the signal conductors 46 and 108 of the cables 14 and 18, respectively, in electrical engagement with each other. The channel 106 may be configured to hold two differently sized signal conductors having a variety of different diameters. As used herein, two structures are "electrically engaged" and in "electrical engagement" with each other when they are electrically connected together via physical contact, solder, a weld, and/or the like. In some embodiments, the channel 106 is configured to hold the signal conductors 46 and 108 in a press-fit arrangement wherein the signal conductors 46 and 108 are pressed together in physical contact such that a sufficient electrical connection is formed without using solder, a weld, and/or the like. In other embodiments, the signal conductors 46 and 108 are soldered, welded, crimped and/or the like together to form a sufficient electrical connection therebetween.

As described above, in an exemplary embodiment each of the cables 14 and 18 has two respective signal conductors 46 and 108. Accordingly, the exemplary embodiment of the housing 102 of the cable splice 16 includes two channels 106, each of which holds a corresponding pair of the signal conductors 46 and 108. But, the housing 102 may include any number of channels 106 for splicing together cables having any number of signal conductors. Each of the channels 106 may be referred to herein as a "first" and/or a "second" channel.

The ground shield 104 includes a body 110 external to the housing 102. The housing 102 of the cable splice 16 may be held by the body 110 of the ground shield 104 such that the body 110 extends at least partially around the housing 102 and the ends 50 and 52 of the cables 14 and 18, respectively. The body 110 of the ground shield 104 thus extends at least partially around the signal conductors 46 and 108 to provide shielding for the signal conductors 46 and 108 from EMI and/or RFI.

To energize the body 110 and thereby provide the signal conductors 46 and 108 with the shielding described above, the body 110 of the ground shield 104 is electrically connected to the electrical ground conductor 48 (e.g., an electrically conductive braid, an electrically conductive foil, and/or the like) of the cable 14. The body 110 of the ground shield 104 is also electrically connected to an electrical ground conductor 112 (e.g., an electrically conductive braid, an electrically conductive foil, a cable drain, and/or the like) of the cable 18. In the exemplary embodiment, the cables 14 and 18 are provided with electrically conductive cable ferrules 116 and 118, respectively, and the body 110 of the ground shield 104 is electrically connected to the ground conductors 48 and 112 via the respective cable ferrules 116 and 118. Specifically, the cable ferrules 116 and 118 are secured around the ends 50 and 52 of the cables 14 and 18, respectively, such that the cable ferrules 116 and 118 are electrically engaged with the respective ground conductors 48 and 112. The body 110 of the ground shield 104 is electrically engaged with the cable ferrules 116 and 118 such that the body 110 is electrically connected to the ground conductors 48 and 112.

In the exemplary embodiment, the ground shield 104 includes spring tabs 120 that project radially inwardly and each electrically engage the corresponding cable ferrule 116 or 118 to electrically connect the body 110 of the ground shield 104 to the ground conductors 48 and 112. In some embodiments, the tabs 120 are configured to engage in physical contact with the corresponding cable ferrule 116 or 118 such that a sufficient electrical connection is formed without using solder, a weld, and/or the like. In other embodiments, the tabs 120 are soldered, welded, and/or the like to the corresponding cable ferrule 116 or 118 to form a sufficient electrical connection therebetween. Each tab 120 may be differently configured (e.g., sized, shaped, and/or the like) from one or more other tabs 120, for example to facilitate accommodating the corresponding larger or smaller diameter cable.

In other embodiments, other arrangements, configurations, and/or the like may be used to electrically connect the body 110 of the ground shield 104 to the ground conductors 48 and/or 112 in addition or alternative to the tabs 120. For example, the body 110 of the ground shield 104 may be crimped around the ends 50 and 52 of the cables 14 and 18, respectively, to bring the body 110 (and/or any tabs 120 that optionally may be included) into electrical engagement with the cable ferrules 116 and/or 118 (in addition or alternative to using any solder, welds, and/or the like). Another example includes forming openings (not shown) within the body 110 that can be welded, filled with solder, and/or the like.

In the exemplary embodiment, the body 110 of the ground shield 104 has a rectangular shape. But, the body 110 additionally or alternatively may include any other size (e.g., relative to the housing 102, the cable 14, and/or the cable 18), shape, and/or the like, which may be selected to provide the signal conductors 46 and 108 with a predetermined ground shielding. Moreover, and for example, the various parameters of the body 110, the housing 102, and/or other components and/or features of the cable splice 16 may be selected to provide impedance control and/or minimize electrical reflections along the cable splice 16. Examples of such parameters that may be selected to provide impedance control and/or minimize electrical reflections along the cable splice 16 include, but are not limited to, the size, shape, and/or the like of the body 110, the size, shape, and/or the like of the housing 102, the relative size, shape, and/or the like between the housing 102 and the body 110, the materials of the housing 102, the amount of air held within the housing 102, the size of the volume of air between the housing 102 and the body 110, and/or the like.

The cable splice 16 optionally includes an electrically insulative covering (not shown) that extends over at least a portion of the body 110 of the ground shield 104 to electrically insulate the body 110. Optionally, the cable splice 16 includes one or more strain relief structures (not shown) that extend over at least a portion of the body 110 of the ground shield 104 and the ends 50 and/or 52 of the cables 14 and/or 18, respectively, to provide strain relief to the cables 14 and/or 18. For example, the strain relief structure may be an electrically insulative sleeve (e.g., a heat shrink sleeve and/or the like) that extends over the body 110 of the ground shield 104 and the ends 50 and 52 of the cables 14 and 18, respectively, to electrically insulate the body 110 and to provide the cables 14 and 18 with strain relief. In other embodiments, the cable splice 16 includes one or more discrete strain relief structures (e.g., a boot and/or the like) that provide strain relief to either the cable 14 or the cable 18. In some embodiments, the cable splice 16 includes an electrically insulative structure (not shown) that does not provide strain relief. Moreover, in some embodiments the cable splice 16 includes a strain relief structure that is not electrically insulative.

Figure 4:
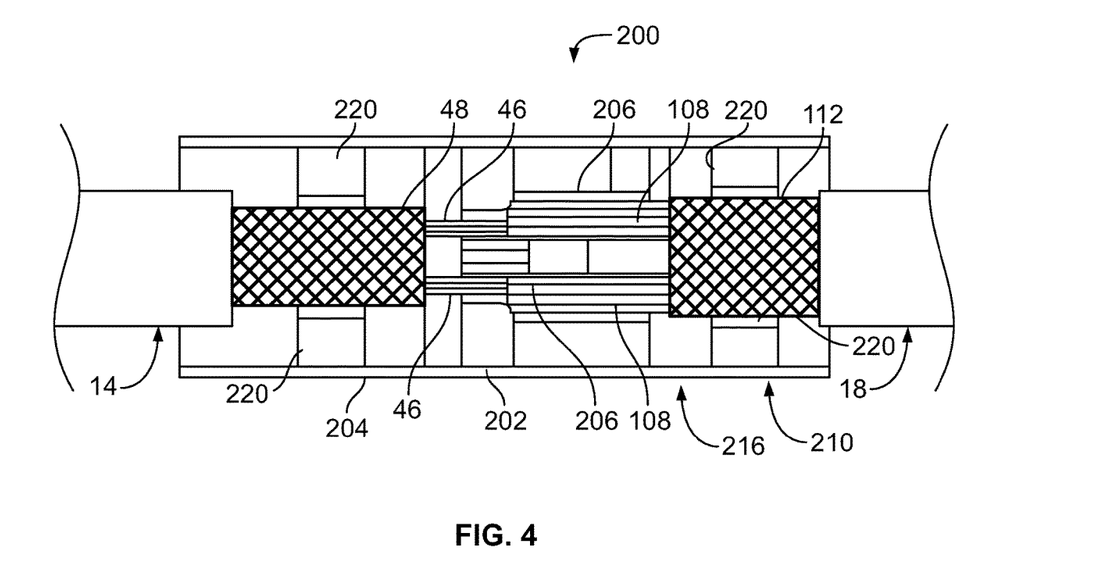
FIG. 4 is a cross-sectional view of another embodiment of a cable assembly.

FIG. 4 is a cross-sectional view of another embodiment of an electrical cable assembly 200 illustrating an embodiment that does not include cable ferrules (i.e., the cable ferrules 116 and 118 shown in FIGS. 2 and 3 are not included). The cable assembly 200 includes a cable 14, a cable splice 216, and a cable 18. The cable splice 216 includes a housing 202 and an electrical ground shield 204. The housing 202 includes one or more channels 206 that hold a corresponding signal conductor 46 of the cable 14 and a corresponding signal conductor 108 of the cable 18. Each of the channels 106 may be referred to herein as a "first" and/or a "second" channel.

The ground shield 204 includes a body 210 that holds the housing 202 and provides shielding for the signal conductors 46 and 108 from EMI and/or RFI. The body 210 of the ground shield 204 is electrically connected to the electrical ground conductor 48 of the cable 14 and to the electrical ground conductor 112 of the cable 18. Specifically, the body 210 is electrically engaged with each of the ground conductors 48 and 112. In the exemplary embodiment, the ground shield 204 includes spring tabs 220 that project radially inwardly and each electrically engage the corresponding ground conductor 48 or 112 to electrically connect the body 210 of the ground shield 204 to the ground conductors 48 and 112. In some embodiments, the tabs 220 are configured to engage in physical contact with the corresponding ground conductor 48 or 112 such that a sufficient electrical connection is formed without using solder, a weld, and/or the like. In other embodiments, the tabs 220 are soldered, welded, and/or the like to the corresponding ground conductor 48 or 112 to form a sufficient electrical connection therebetween. Each tab 220 may be differently configured (e.g., sized, shaped, and/or the like) from one or more other tabs 220, for example to facilitate accommodating the corresponding larger or smaller diameter cable.

In other embodiments, other arrangements, configurations, and/or the like may be used to electrically connect the body 210 of the ground shield 204 to the ground conductors 48 and/or 112 in addition or alternative to the tabs 220. For example, the body 210 of the ground shield 204 may be crimped around the ends 50 and 52 of the cables 14 and 18, respectively, to bring the body 210 (and/or any tabs 220 that optionally may be included) into electrical engagement with the ground conductors 48 and 112 (in addition or alternative to using any solder, welds, and/or the like). Another example includes forming openings (not shown) within the body 210 that can be welded, filled with solder, and/or the like.

Figure 5:
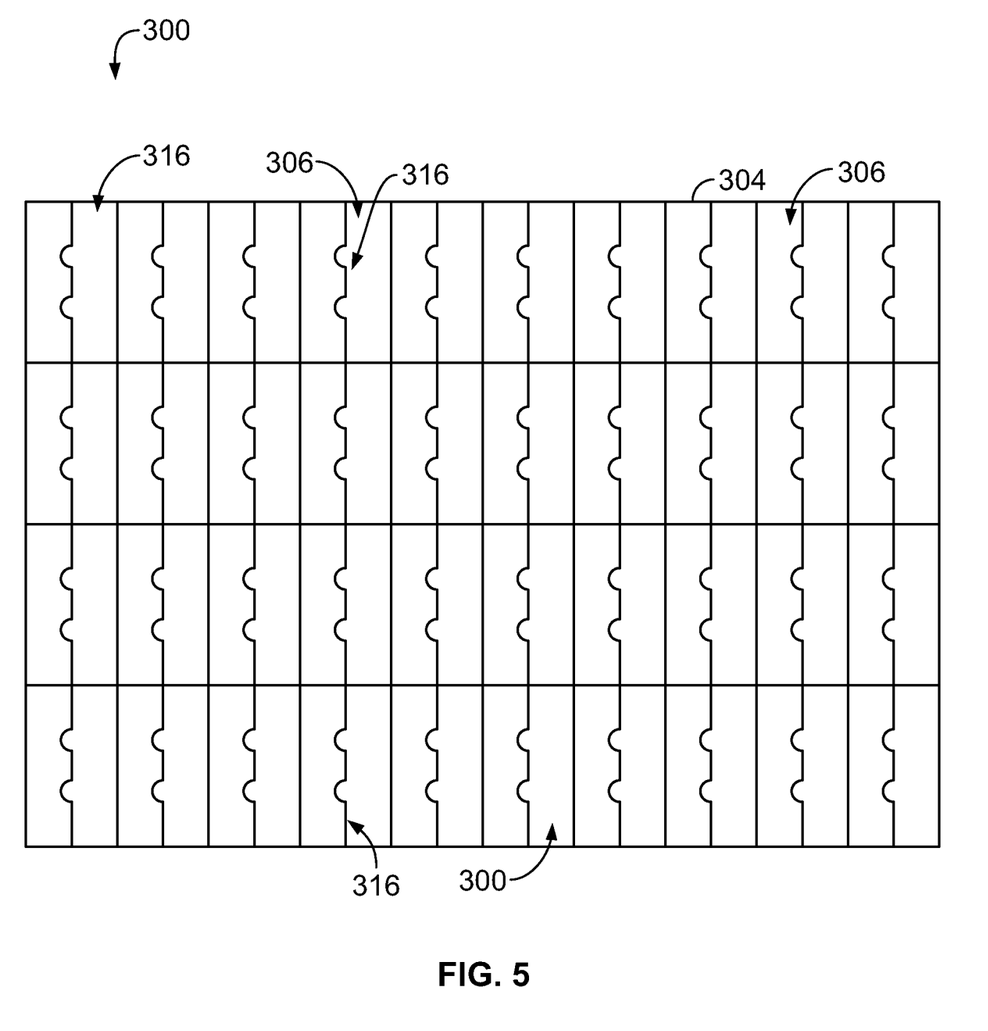
FIG. 5 is an elevational view of an embodiment of an array of electrical cable splices.

A plurality of the electrical cable splices 16 (shown in FIGS. 1-3) can be grouped together in a single array to facilitate organizing the termination interface of a corresponding connector. For example, FIG. 5 is an elevational view of an embodiment of an array 300 of electrical cable splices 316 configured for use with the termination interface 42 (shown in FIG. 1) of the electrical connector 12 (shown in FIG. 1). As shown in FIG. 5, the cable splices 316 share a common ground shield structure 304 that includes a plurality of ports 306 for accommodating each of the electrical cables 14 that terminate the connector 12 at the termination interface 42.

In the exemplary embodiment, the array 300 includes a rectangular shape and forty cable splices 316 arranged in a plurality of rows and columns to complement the pattern and number of the electrical connections of the termination interface 42. But, in addition or alternative, the array 300 may include any other shape and any other number of cable splices 316 arranged in any other pattern (e.g., a circular pattern and/or the like) to accommodate a variety of differently arranged and configured termination interfaces.

The embodiments described and/or illustrated herein provide an electrical cable splice that enables a larger diameter cable to be electrically connected to a smaller diameter cable. The embodiments described and/or illustrated herein provide an electrical cable splice that enables larger diameter (and therefore lower electrical loss) cables to be terminated to connectors having termination interfaces with a relatively high density of electrical connections. The embodiments described and/or illustrated herein provide an electrical cable splice that enables electrical connectors that have relatively high-density termination interfaces to be used with electrical cabling that spans larger distances.

It should be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and/or the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical cable splice comprising:
a housing extending between a first end and a second end of the housing, the housing having a first channel and a second channel defined by upstanding channel walls, the channel walls of the first channel configured to engage and hold a first signal conductor of a first electrical cable therein and configured to engage and hold a second signal conductor of a second electrical cable therein in electrical engagement with the first signal conductor such that the first and second signal conductors are electrically interconnected, the first channel being sized to hold the first and second signal conductors such that the first and second signal conductors are connected together in physical contact to electrically connect the first and second signal conductors, the channel walls of the second channel configured to engage and hold a third signal conductor of the first electrical cable therein and configured to engage and hold a fourth signal conductor of the second electrical cable therein in electrical engagement with the third signal conductor such that the third and fourth signal conductors are electrically interconnected, the second channel is sized to hold the third and fourth signal conductors such that the third and fourth signal conductors are coupled together in physical contact to electrically connect the third and fourth signal conductors, the first channel having a first width between the channel walls at the first end of the housing and the first channel having a second width between the channel walls at the second end of the housing wider than the first width to accommodate the first signal conductor and the second signal conductor, respectively, wherein the second signal conductor has a greater diameter than the first signal conductor, the second channel having a third width between the channel walls at the first end and the second channel having a fourth width between the channel walls at the second end wider than the third width to accommodate the third signal conductor and the fourth signal conductor, respectively, wherein the fourth signal conductor has a greater diameter than the third signal conductor; and a ground shield external to the housing, the ground shield surrounding the housing along the first and second channels to provide electrical shielding for the interface between the first and second signal conductors and to provide electrical shielding for the interface between the third and fourth signal conductors, the ground shield configured to be electrically connected to a first electrical ground conductor of the first electrical cable at a first ground interface, the ground shield configured to be electrically connected to a second electrical ground conductor of the second electrical cable at a second ground interface.

2. The electrical cable splice of claim 1, wherein the ground shield includes a first engaging feature projecting inward from an external surface of the ground shield, the first engaging feature is configured to deflect against and electrically connect to the first electrical ground conductor of the first electrical cable, the ground shield including a second engaging feature projecting inward from the external surface of the ground shield, the second engaging feature is configured to deflect against and electrically connect to the second electrical ground conductor of the second electrical cable.

3. The electrical cable splice of claim 1, further comprising first and second cable ferrules that are electrically engaged with the respective first and second electrical ground conductors of the respective first and second electrical cables, the ground shield being electrically engaged with each of the first and second cable ferrules to electrically connect the ground shield to the first and second electrical ground conductors of the first and second electrical cables, respectively.

4. The electrical cable splice of claim 1, wherein the ground shield extends forward of a first end of the housing and extends rearward of a second end of the housing, the ground shield engaging and being electrically connected to the first electrical ground conductor forward of the first end of the housing, the ground shield engaging and being electrically connected to the second electrical ground conductor rearward of the second end of the housing.

5. The electrical cable splice of claim 1, further comprising a strain relief structure that extends over at least a portion of the ground shield to provide strain relief to at least one of the first or second electrical cables.

6. The electrical cable splice of claim 1, wherein the first and second signal conductors are at least one of soldered or welded together.

7. The electrical cable splice of claim 1, wherein the first channel is sized to accommodate the first and second conductors overlapping each other in the first channel and the second channel is sized to accommodate the third and fourth conductors overlapping each other in the second channel.

8. The electrical cable splice of claim 1, wherein the ground shield is at least one of welded or soldered to the electrical ground conductors or ferrules of at least one of the first and second electrical cables.

9. The electrical cable splice of claim 1, wherein the ground shield is crimped over the first and second electrical cables to electrically engage the ground shield with the electrical ground conductors or ferrules of the first and second electrical cables.

10. The electrical cable splice of claim 1, wherein the first electrical cable is terminated to an electrical connector.

11. An electrical cable assembly comprising:

a first electrical cable having a first signal conductor and a third signal conductor, the first electrical cable having at least one insulator surrounding the first signal conductor and the second signal conductor, the first electrical cable having a first electrical ground conductor surrounding the at least one insulator to provide electrical shielding for both the first signal conductor and the third signal conductor;

a second electrical cable having a second signal conductor and a fourth signal conductor, the second electrical cable having at least one insulator surrounding the second signal conductor and the fourth signal conductor, the second electrical cable having a second electrical ground conductor surrounding the at least one insulator to provide electrical shielding for both the second signal conductor and the fourth signal conductor, the second signal conductor having a greater diameter than the first signal conductor, the fourth signal conductor having a greater diameter than the third signal conductor; and a cable splice comprising:

a housing having a first channel and a second channel defined by upstanding channel walls, the channel walls of the first channel engaging and holding the first and second signal conductors therein in electrical engagement with each other such that the first and second signal conductors are electrically interconnected, the channel walls of the second channel engaging and holding the third and fourth signal conductors therein in electrical engagement with each other such that the third and fourth signal conductors are electrically interconnected; and a ground shield external to the housing, the ground shield surrounding the first and second signal conductors to provide electrical shielding for the interface between the first and second signal conductors, the ground shield surrounding the third and fourth signal conductors to provide electrical shielding for the interface between the third and fourth signal conductors, the ground shield includes a first engaging feature projecting inward from an external surface of the ground shield, the first engaging feature being deflectable against and electrically connected to the first electrical ground conductor of the first electrical cable to electrically connect the ground shield to the first electrical ground conductor, the ground shield including a second engaging feature projecting inward from the external surface of the ground shield, the second engaging feature being deflectable against and electrically connected to the second electrical ground conductor of the second electrical cable to electrically connect the ground shield to the second electrical ground conductor.

12. The electrical cable assembly of claim 11, wherein the first channel is sized to hold the first and second signal conductors such that the first and second signal conductors are connected together in physical contact to electrically connect the first and second signal conductors, and wherein the second channel is sized to hold the third and fourth signal conductors such that the third and fourth signal conductors are connected together in physical contact to electrically connect the third and fourth signal conductors.

13. The electrical cable assembly of claim 11, further comprising first and second cable ferrules that are electrically engaged with the respective first and second electrical ground conductors of the respective first and second electrical cables, the ground shield being electrically engaged with each of the first and second cable ferrules to electrically connect the ground shield to the first and second electrical ground conductors of the first and second electrical cables, respectively.

14. The electrical cable assembly of claim 11, wherein the ground shield extends forward of a first end of the housing and extends rearward of a second end of the housing, the ground shield engaging and being electrically connected to the first electrical ground conductor forward of the first end of the housing, the ground shield engaging and being electrically connected to the second electrical ground conductor rearward of the second end of the housing.

15. The electrical cable assembly of claim 11, wherein the first and second conductors are overlapping each other in the first channel and the third and fourth conductors are overlapping each other in the second channel.

16. The electrical cable assembly of claim 11, wherein the first and second signal conductors are at least one of soldered or welded together.

17. An electrical connector assembly comprising:
a first electrical cable having a first signal conductor and a third signal conductor, the first electrical cable having at least one insulator surrounding the first signal conductor and the second signal conductor, the first electrical cable having a first electrical ground conductor surrounding the at least one insulator to provide electrical shielding for both the first signal conductor and the third signal conductor;
an electrical connector terminated to the first electrical cable;
a second electrical cable having a second signal conductor and a fourth signal conductor, the second electrical cable having at least one insulator surrounding the second signal conductor and the fourth signal conductor, the second electrical cable having a second electrical ground conductor surrounding the at least one insulator to provide electrical shielding for both the second signal conductor and the fourth signal conductor, the second signal conductor having a greater diameter than the first signal conductor, the fourth signal conductor having a greater diameter than the third signal conductor; and
a cable splice comprising:
a housing extending between a first end and a second end of the housing, the housing having a first channel and a second channel defined by upstanding channel walls, the channel walls of the first channel engaging and holding the first signal conductor of the first electrical cable therein and engaging and holding the second signal conductor of the second electrical cable therein in electrical engagement with the first signal conductor such that the first and second signal conductors are electrically interconnected, the first channel being sized to hold the first and second signal conductors such that the first and second signal conductors are connected together in physical contact to electrically connect the first and second signal conductors, the channel walls of the second channel engaging and holding the third signal conductor of the first electrical cable therein and engaging and holding the fourth signal conductor of the second electrical cable therein in electrical engagement with the third signal conductor such that the third and fourth signal conductors are electrically interconnected, the second channel is sized to hold the third and fourth signal conductors such that the third and fourth signal conductors are connected together in physical contact to electrically connect the third and fourth signal conductors, the first channel having a first width at the first end of the housing and the first channel having a second width at the second end of the housing wider than the first width to accommodate the first signal conductor and the second signal conductor, respectively, the second channel having a third width at the first end and the second channel having a fourth width at the second end wider than the third width to accommodate the third signal conductor and the fourth signal conductor, respectively; and
a ground shield external to the housing, the ground shield surrounding the housing along the first and second channels to provide electrical shielding for the interface between the first and second signal conductors and to provide electrical shielding for the interface between the third and fourth signal conductors, the ground shield being electrically connected to the first electrical ground conductor at a first ground interface, the ground shield being electrically connected to the second electrical ground conductor at a second ground interface.

18. The electrical connector assembly of claim 17, wherein the ground shield includes a first engaging feature projecting inward from an external surface of the ground shield, the first engaging feature is configured to deflect against and electrically connect to the first electrical ground conductor of the first electrical cable, the ground shield including a second engaging feature projecting inward from the external surface of the ground shield, the second engaging feature is configured to deflect against and electrically connect to the second electrical ground conductor of the second electrical cable.

* * * * *